United States Patent [19]

Meador

[11] Patent Number: 4,946,890

[45] Date of Patent: Aug. 7, 1990

[54] LADDER POLYMERS FOR USE AS HIGH TEMPERATURE STABLE RESINS OR COATINGS

[75] Inventor: Mary Ann Meador, Strongsville, Ohio

[73] Assignee: The United States of America as represented by the Administrator, National Aeronautics and Space Administration, Washington, D.C.

[21] Appl. No.: 231,026

[22] Filed: Aug. 11, 1988

[51] Int. Cl.$^5$ ............................................. C08G 73/10
[52] U.S. Cl. .................................... 524/600; 525/436; 528/353
[58] Field of Search ...................... 525/436; 528/353; 524/600

[56] References Cited

U.S. PATENT DOCUMENTS

| | | | |
|---|---|---|---|
| 2,194,450 | 3/1940 | Scott | 260/666 |
| 3,947,402 | 3/1976 | Volkommer et al. | 525/436 X |
| 4,123,219 | 10/1978 | Sasse et al. | 432/1 |
| 4,166,168 | 8/1979 | D'Alelio | 525/436 X |
| 4,365,034 | 12/1982 | Grimes et al. | 525/436 X |
| 4,457,828 | 7/1984 | Lewis | 585/11 |
| 4,465,585 | 8/1984 | Lewis | 208/22 |
| 4,886,874 | 12/1989 | Nagano et al. | 528/353 |

*Primary Examiner*—Earl Nielsen
*Attorney, Agent, or Firm*—James A. Mackin; Gene E. Shook; John R. Manning

[57] ABSTRACT

A processable, high temperature polymer derived from 1,4,5,8-tetrahydro-1,4;5,8-diepoxyanthracene and a bisdiene, particularly an anthracene end-capped polyimide oligomer and a method for the preparation thereof. Also provided is a fabricated, electrically conducting, void-free composite comprising said polymer.

15 Claims, No Drawings

LADDER POLYMERS FOR USE AS HIGH TEMPERATURE STABLE RESINS OR COATINGS

This invention was made by a Government employee and may be manufactured or used by or for the Government without the payment of any royalties thereon or therefor.

BACKGROUND OF THE INVENTION

1. Field of the Invention

The present invention relates to the synthesis of a new class of ladder and partial ladder polymers. For reviews on ladder and partial ladder polymers, see: C. G. Overberger, J. A. Moore *Adv. Polymer Sci.*, 1970, 7, 113; C. Arnold *J. Polymer Sci.: Macromolecular Rev.*, 1979, 14, 265; D. K. Saltbayev, B. A. Zhabanov, L. V. Pvovarova, *Polymer Sci. U.S.S.R.*, 1980, 21, 799. A ladder polymer comprises an uninterrupted series of rings such that a double strand is formed. (See below.)

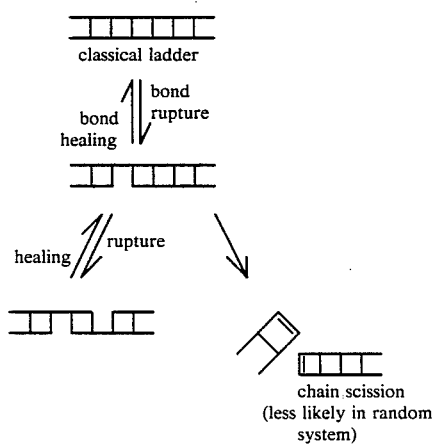

Ladder polymers are, intuitively, more thermally stable than the related single strand polymers since cleavage of two bonds in the same connecting ring, which is a characteristic of ladder polymers, is necessary to cause chain scission. If the bond breakage is completely random, that is, if all the connecting links are equally strong, then chain scission is less likely to occur. In addition, since the two broken segments are held close to each other after one bond ruptures, a recombination or "bond healing" of the ruptured bond is possible. An illustration of the above is as follows:

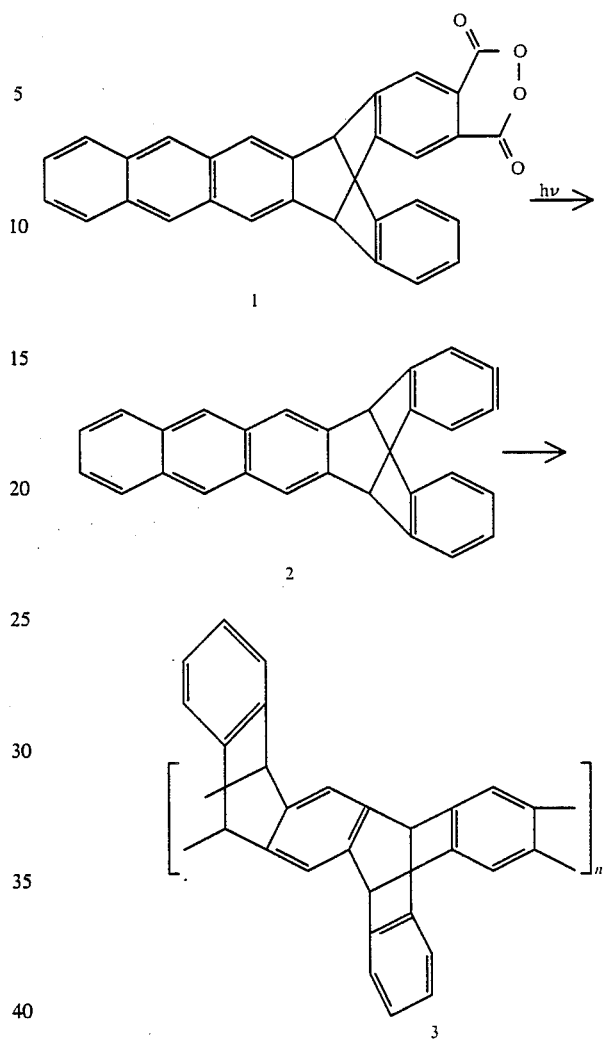

The ladder polymer 3, a polyiptycene, (The name "iptycene" emphasizes the relationship between these compounds and the parent structure, triptycene. A prefix indicates the number of separated arene planes; thus 1, is a triptycene (three planes) and 3 is a polyiptycene (many planes). (See also Hart, H.; Shamouilian, S.; Takehira, Y.: *J. Org. Chem.*, 1981, 46, 4427.) Polyiptycene behaves as a classical ladder since all the bridging bonds are equally strong. Additionally, since the connecting links are unstrained [2.2.2]-octabicyclic systems, bond healing is possible. Thus, polyiptycene is highly thermally stable.

The synthetic route to 3, shown above, involves a Diels-Alder addition of the photochemically generated aryne intermediate 2 to the anthracene moiety on another molecule of 1. Monomer 1 is prepared as follows. Bis-epoxide 4 reacts as a dienophile with anthracene 5 to form the one to one adduct 6. Deoxygenation to triptycene followed by side chain manipulation yields 1.

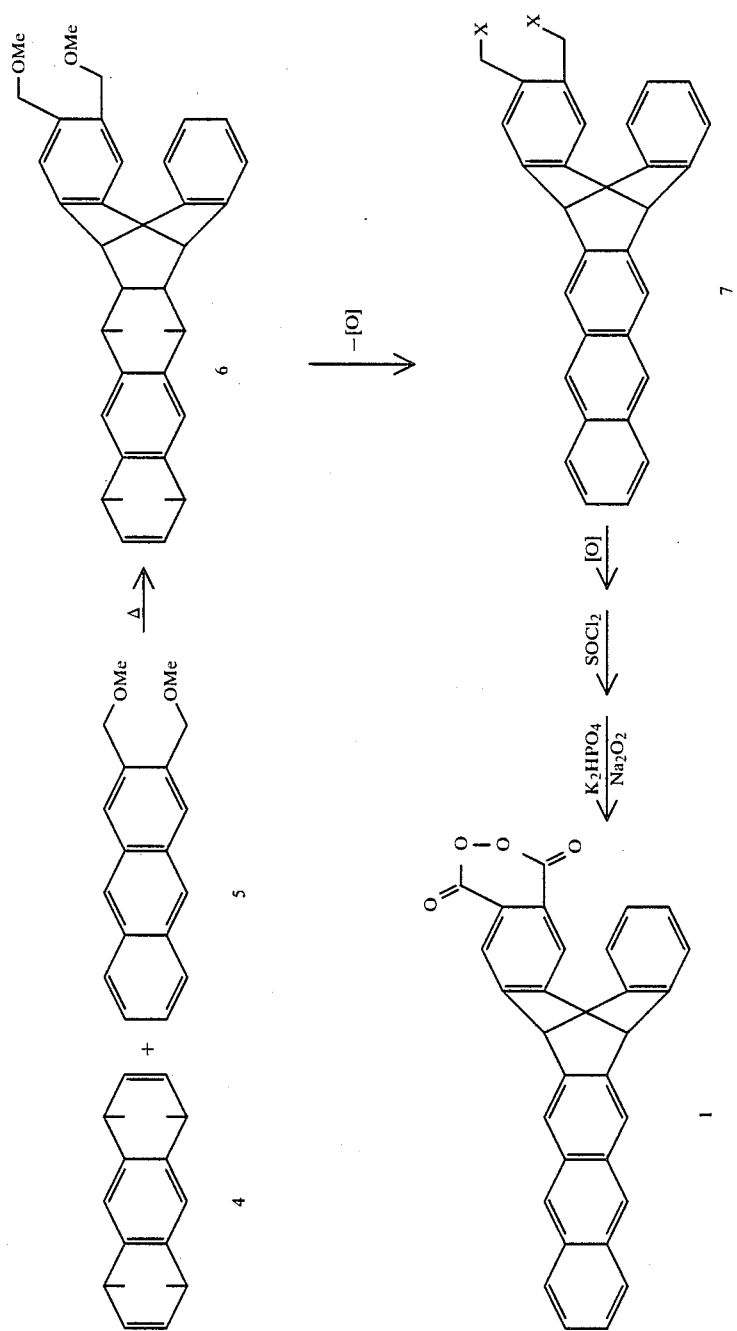

2. Discussion of Related Art

It has been established that 1,4,5,8-tetrahydro-1,4;5,8-diepoxyanthracene, 1, is an effective bis-dienophile for the rapid construction of fused-ring systems, (H. Hart, A. Bashir-Hashemi, J. Luo, and M. A. Meador, *Tetrahedron*, 42, 1641, (1986), Hart, H.; Raju, N.; Meador, M. A.; Ward, D. L.: *J. Org. Chem.*, 1983, 48, 4357). For example, the dehydrated pentiptycene, 2, can be prepared in one step from anthracene and 1. Extension of this chemistry usually thought of as a concerted reaction, Diels-Alder cycloadditions often proceed via a two-step mechanism with either a zwitterionic or biradical intermediate, (J. Sauer and R. Sustmann, *Angew. Chem. Int. Ed. Engl.*, 19 779, (1980)).

In this invention, the synthesis of thermally stable co-polymers from the reaction of anthracene end-capped polyimide oligomers acting as bis-dienes and bis-dienophile 1 will be discussed. The anthracenes are linked through the 2-position, remote from the site of

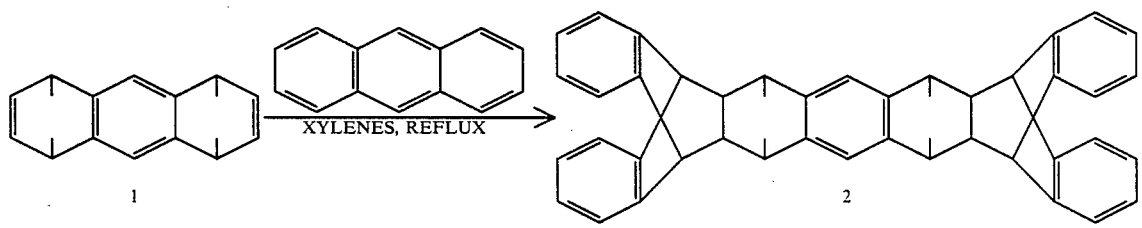

to the synthesis of ladder or partial ladder polymers can be accomplished by reacting bis-dienophile 1 with a bis-diene (W. J. Bailey, In *Step-Growth Polymerizations*, D. H. Solomons, Ed., Marcel Dekker, New York, 1972, Chapter 6).

Compounds such as 2 have extremely high melting points and decomposition temperatures. (M. A. Meador, *Model Studies of Diels-Alder Polymers Using 1,4.5.8-Tetrahydro-1,4;5,8-Diepoxyanthracene as a Bis-dienophile*, 18th Central Regional Meeting, Am. Chem. Soc., Bowling Green, OH, June 1986). Thus, polymers made from 1 and thermally stable bis-dienes have potential for high temperature applications. Although many Diels-Alder polymers have been investigated in the past, only three studies have employed anthracenes as the reactive diene (J. S. Meek, P. A. Argabright, R. D. Stacy, 134th National Meeting, Am. Chem. Soc. Chicago, IL, September 1958, abstracts, 23, M. P. Stevens, *J. Polym. Sci. Polym. Lett. Ed.*, 22, 467 (1984)). One early study involved copolymerization of a 9,9'-linked bis-anthracene, 3, with a bis-dienophile, leading only to very low molecular weight polymers (S. Dumitrescu, M. Grigoras, and A. Natansohn, *J. Polym. Sci. Polym. Lett. Ed.*, 17, 553 (1979)). This has been attributed to steric congestion at the site of cycloaddition, (Bailey, cited above).

A more recent report, (Stevens, cited above), described the Diels-Alder polymerization of N-(2-anthryl)maleimide, containing a reactive dienophile unit linked to the diene at a position remote from the site of cycloaddition, thus reducing steric hindrance. However, once more, only low molecular weight polymer was obtained The author speculated that this was dueto the ease of reversibility of the Diels-Alder reaction. While this may be the case, a more likely explanation is that Diels-Alder cycloaddition is competing with vinyl polymerization of the maleimide units. Any attempt to prevent this vinyl polymerization, such as by lowering the reaction temperature or using a free radical quencher, may also inhibit addition reaction. Although cycloaddition, and the bis-epoxide 1 does not undergo vinyl polymerization at the same temperature that cycloaddition takes place.

SUMMARY OF THE INVENTION 1,4,5,8-Tetrahydro-1,4;5,8-diepoxyanthracene reacts with various anthracene end-capped polyimide oligomers to form Diels-Alder cycloaddition copolymers. The polymers are soluble in common organic solvents, and have molecular weights of approximately 20,000 to 40,000. These resins undergo a unique dehydration (loss of water ranges from 2 to 5 percent) at temperatures of 300 to 400.C. to give thermo-oxidatively stable pentiptycene units along the polymer backbone. Because of their high softening points and good thermo-oxidative stability, the polymers have potential as processable, matrix resins for high temperature composite applications.

DETAILED DESCRIPTION OF THE INVENTION

In accordance with the present invention, addition ladder or partial ladder polymers are synthesized using bis-dienophiles with the general structure 1 where X can be N—R, $CH_2$, O or S and bis-dienes.

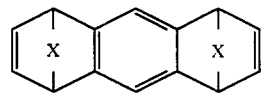

Several such polymers are produced by polymerizing 1,4,5,8-tetrahydro-1,4;5,8-diepoxyanthracene 2 (X=0) as bis-dienophile 2 with anthracene end-capped polyimide oligomers 3-8 as bis-dienes to form corresponding polymers 9-14, wherein such polymers are processable and possess exceptional thermal stability.

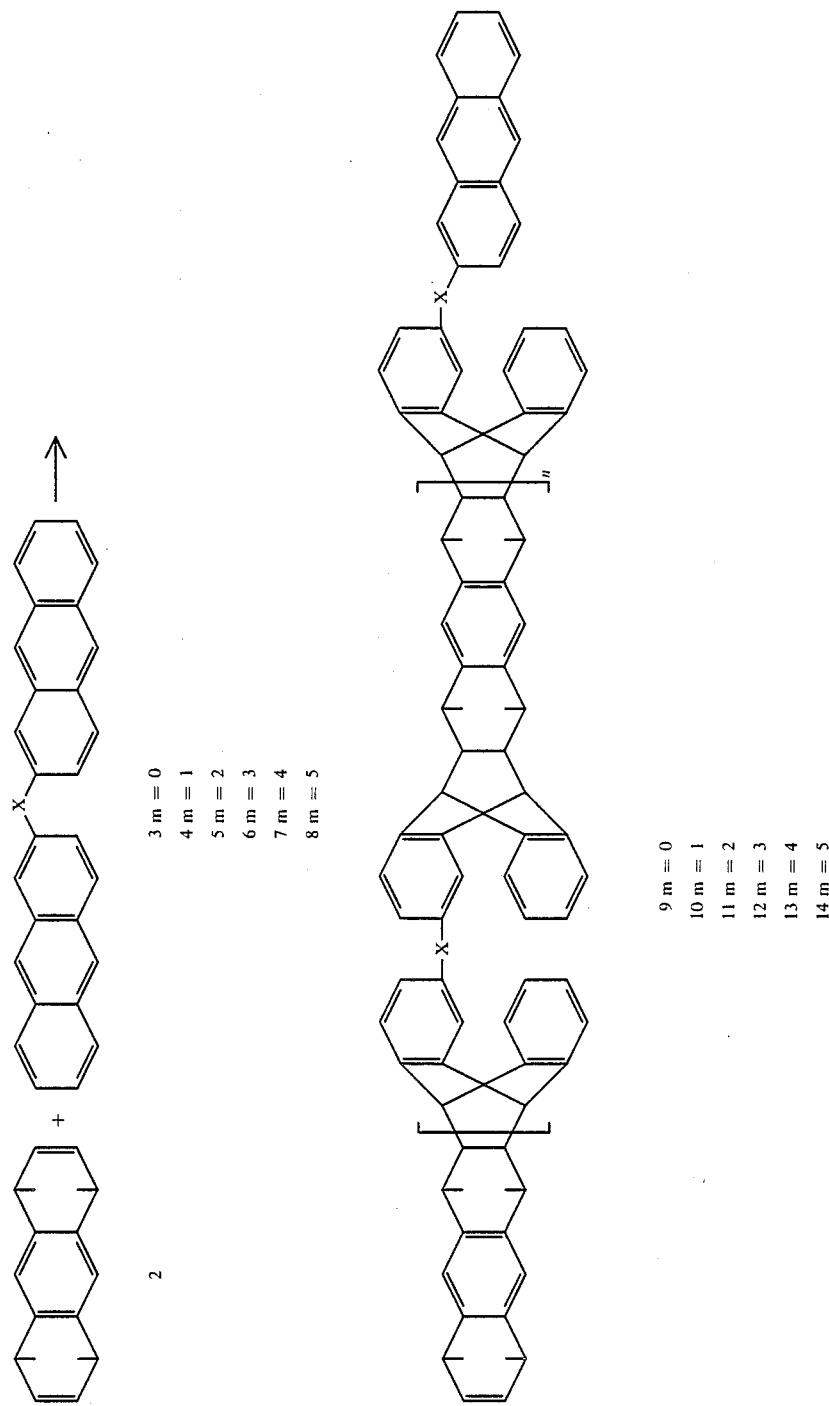

wherein x is
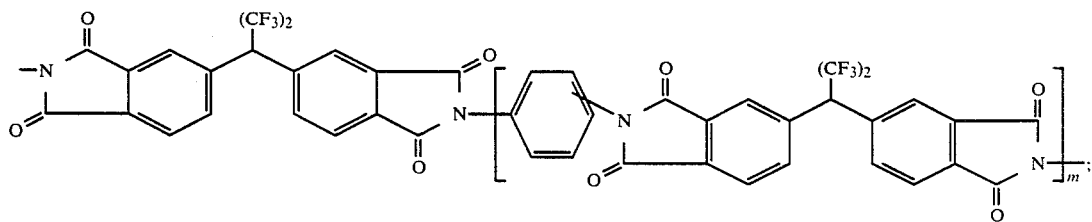
and
n is 15–30.
Syntheses of anthracene end-capped oligomers 3–8 are carried out according to the general scheme:

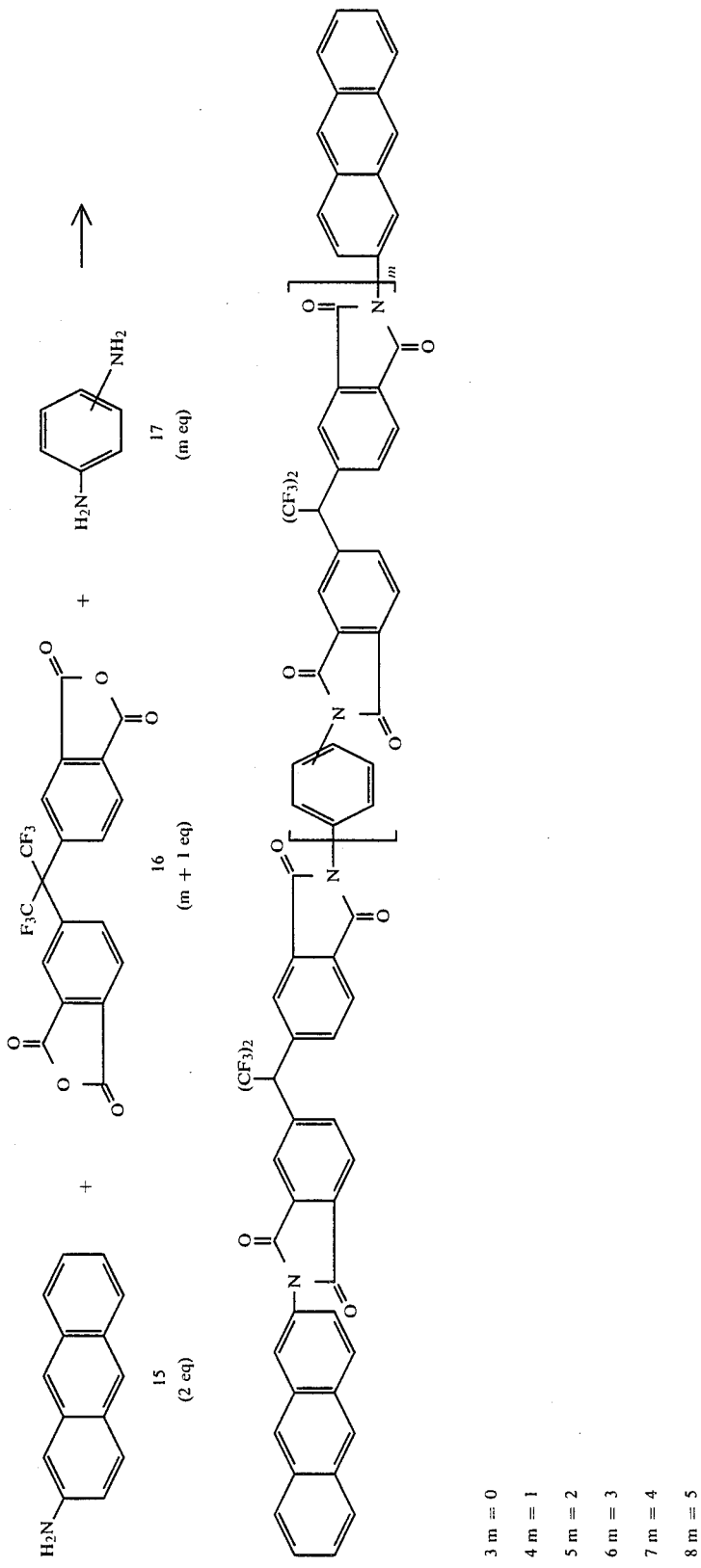

The present invention is more particularly described and explained by means of the following Example.

EXAMPLE

A solution of 2-aminoanthracene 15 (3.86g, 20 mmole), 4,4'-(hexafluoroisopropyl-idene)bis(phthalic anhydride) 16 (8.88g, 20 mmole) and p-phenylene-diamine 17 (1.08g, 10 mmole) in 300 ml acetic acid is refluxed for three hours. Acetic anhydride (20 ml) is added, and reflux is continued for another thirty minutes. Then, the reaction mixture is cooled in an ice bath and 100 ml of water is added. The precipitate which forms is filtered and washed with 200 ml cold water. The crude product is triturated with 100 ml methanol, and filtered, yielding 12.9g (98% yield) of yellow powder which is anthracene endcapped oligomer 4.

Addition polymerization is carried out as follows: A one to one mixture of bis-epoxide 2 (2.10g, 10 mmole) and oligomer 4 (13.10g, 10 mmole) is dissolved in 100ml N,N-dimethylformamide and heated in a pressure reactor at 155-165° C. for thirty-six hours at 400 psi. After this time the reaction is cooled, depressurized and the solvent removed. The amber colored solid remaining is dried at 400° F. for four hours, and at 550° F. for 1 hour to give polymer 10 (molecular weight of 32,000) in quantitative yield. (Molecular weight of the polymer is determined by integration of NMR spectra.)

These polymers are highly soluble in organic solvents, such as chloroform, N-methylpyrrolidinone and N,N-dimethyl-formamide. Therefore, solutions of the polymers can be cast on carbon fibers, or dried to brittle films. Further heat treatment of the "as cast" films or prepregs can be carried out in a press at 340-380° C. in order to thermally dehydrate the polymers. Thus, it is simple to fabricate the polymers into void-free neat resins or composites. After this final cure, the polymers are resistant to solvent, possess high glass transition temperatures (as high as 420° C.), and have good thermo-oxidative stability. In addition, if carbon fibers are used, a composite can be fabricated having electrical conductivity properties which are about the same as the fibers themselves.

OTHER EMBODIMENTS OF THE PRESENT INVENTION

Other examples of addition polymerized ladders and partial ladders are shown below. These addition reactions are quite general. Hence, fine-tuning of polymer properties by using a wide variety of bis-dienes with bis-dienophile 2

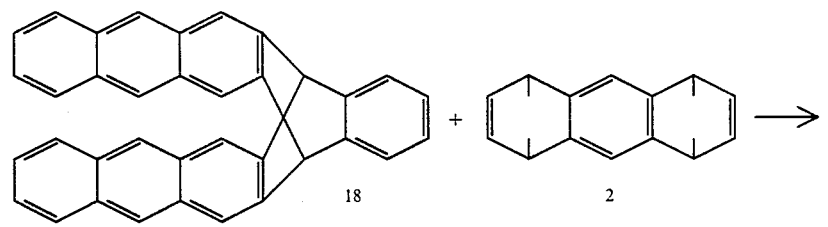

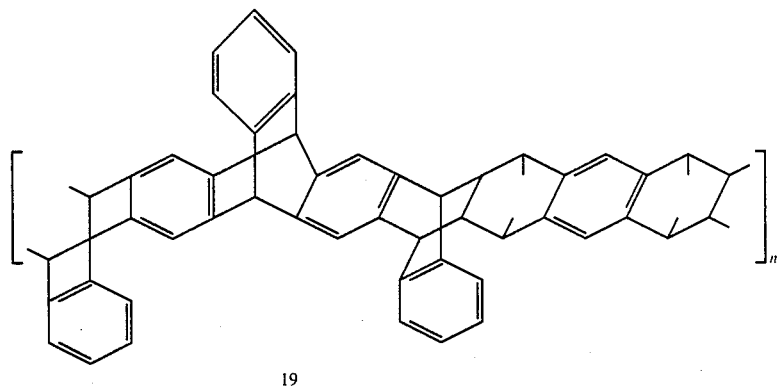

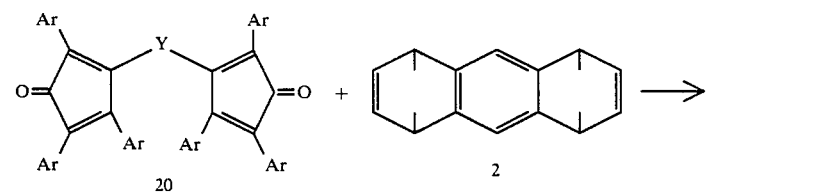

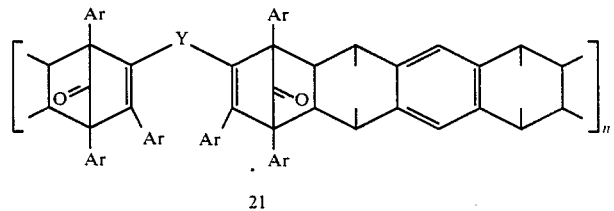

is quite simple. The furan macrocycle 22 is a tetrakisdiene. Use of 18 with a bisdienophile, would allow for facile creation of a network structure.

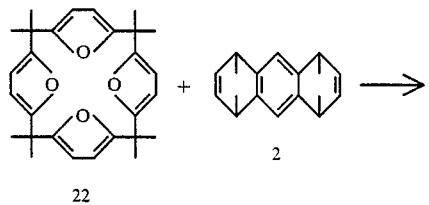

22

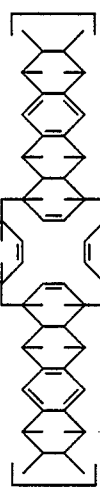

23

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed

1. An addition ladder polymer having the following general formula:

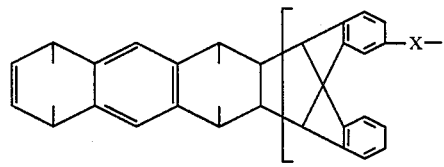

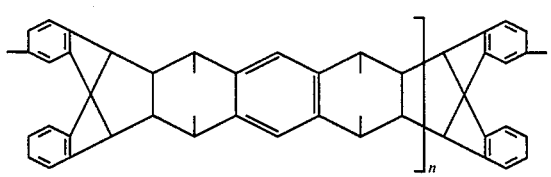

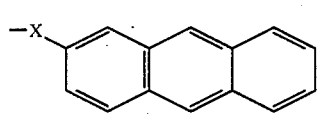

in which n is 15 to 30; and
x is

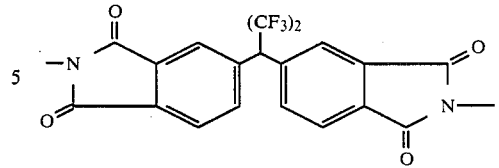

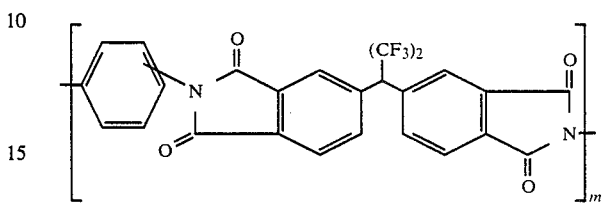

wherein m is 0 to 5.

2. The addition ladder polymer of claim 1, wherein m is 0.

3. The addition ladder polymer of claim 1, wherein m is 1.

4. The addition ladder polymer of claim 1, wherein m is 2.

5. The addition ladder polymer of claim 1, wherein m is 3.

6. The addition ladder polymer of claim 1, wherein m is 4.

7. The addition ladder polymer of claim 1, wherein m is 5.

8. A process for preparing an addition ladder polymer having the following general formula:

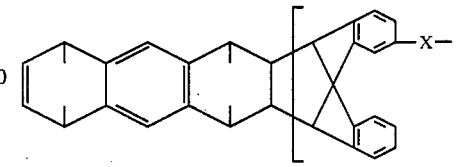

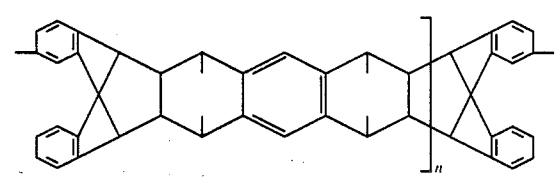

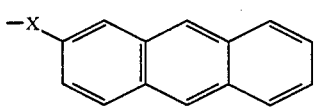

in which n is 15 to 30; and
x is

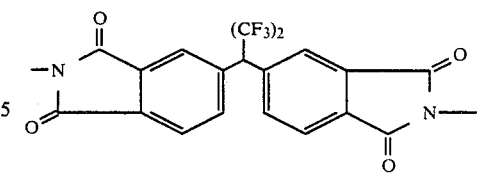

-continued

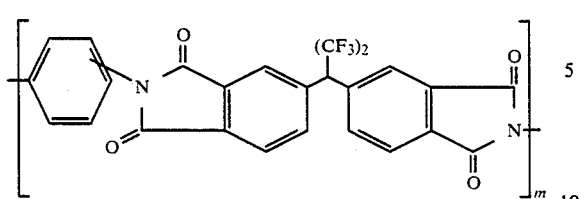

wherein m is 0 to 5;
  said process comprising polymerizing:
    a bis-dienophile having the formula:

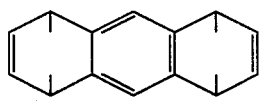

with a bis-diene having the general formula:

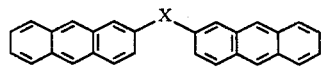

in which x is as defined above.

9. The process of claim 7, wherein m is 0.
10. The process of claim 7, wherein m is 1.
11. The process of claim 7, wherein m is 2.
12. The process of claim 7, wherein m is 3.
13. The process of claim 7, wherein m is 4.
14. The process of claim 7, wherein m is 5.
15. A fabricated, electrically conducting void-free composite comprising carbon fibers and an addition ladder polymer having the following general formula:

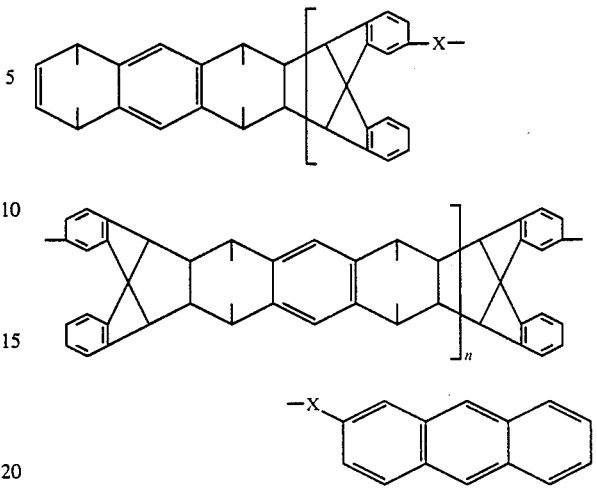

in which n is 15 to 30; and
x is

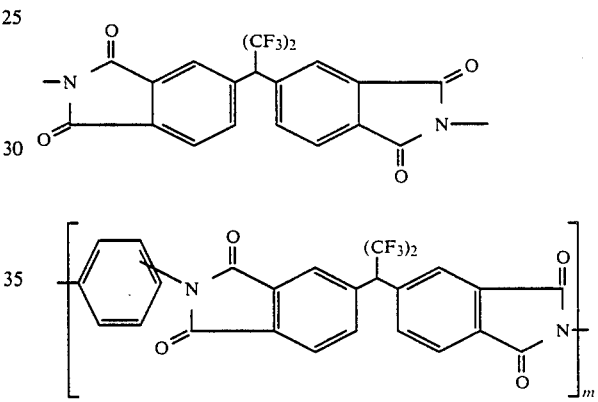

wherein m is 0 to 5.

* * * * *